(12) United States Patent
Kokkelink

(10) Patent No.: US 6,377,720 B1
(45) Date of Patent: Apr. 23, 2002

(54) INLINE OPTICAL CIRCULATORS

(75) Inventor: Jan W. Kokkelink, Blairstown, NJ (US)

(73) Assignee: Micro-Optics, Inc., Hackettstown, NJ (US)

(*) Notice: Subject to any disclaimer, the term of this patent is extended or adjusted under 35 U.S.C. 154(b) by 0 days.

(21) Appl. No.: 09/547,606

(22) Filed: Apr. 12, 2000

Related U.S. Application Data

(60) Provisional application No. 60/129,647, filed on Feb. 24, 1999.

(51) Int. Cl.[7] .................................................. G02B 6/00
(52) U.S. Cl. ......................................... 385/11; 385/484
(58) Field of Search .......................... 385/11; 359/484, 359/496, 497

(56) References Cited

U.S. PATENT DOCUMENTS

| | | | |
|---|---|---|---|
| 4,464,022 A | 8/1984 | Emkey | 350/377 |
| 5,212,586 A | 5/1993 | Van Delden | 359/281 |
| 5,818,981 A | 10/1998 | Pan et al. | 385/11 |
| 5,909,310 A | 6/1999 | Li et al. | 359/484 |
| 5,930,039 A | 7/1999 | Li et al. | 359/484 |
| 6,014,244 A | * 1/2000 | Chang | |
| 6,014,475 A | * 1/2000 | Frisken | |
| 6,212,008 B1 | * 4/2001 | Xie et al. | |

* cited by examiner

Primary Examiner—Hung N. Ngo
(74) Attorney, Agent, or Firm—Michael W. Ferrell

(57) ABSTRACT

Inline optical circulators utilizing birefringent displacers to split an incoming beam into two orthogonally polarized beams and thereafter to recombine the beams. The birefringent displacers are used in combination with non reciprocal devices (Faraday rotators), reflectors and waveplates and serve to route a signal serially to the next port. Specific embodiments utilize birefringent wedges which provide circulators with reduced component counts and simplified alignment of the components. Circulators which do not utilize waveplates, and thus are relatively wavelength insensitive, are also described.

14 Claims, 14 Drawing Sheets

FORWARD DIRECTION
(1 TO 2)

REVERSE DIRECTION
(2 TO 3)

FORWARD DIRECTION
(3 TO 4)

RETURN PASS 1

RETURN PASS 2

RETURN PASS 3

FORWARD 3 TO 4

FIG. 7A
BEAM PROPOGATION WHEN MAINTAINING POLARIZATION

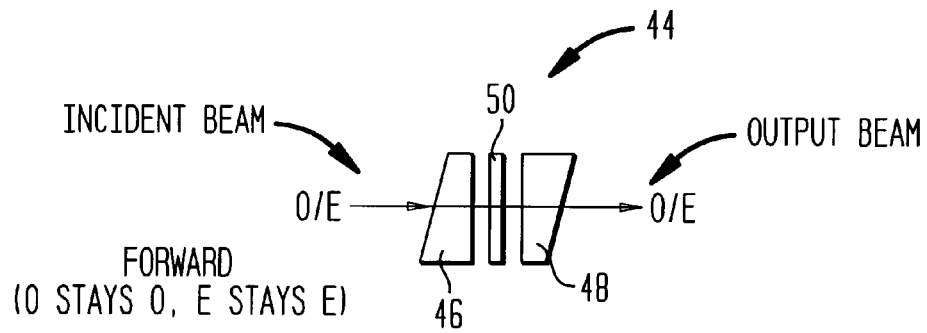

FORWARD
(O STAYS O, E STAYS E)

FIG. 7B
BEAM PROPAGATION WHEN
POLARIZATION STATES ARE REVERSED

REVERSE DIRECTION (E TO O)

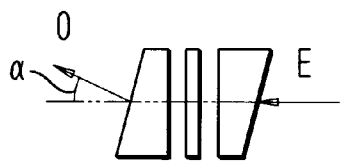

FIG. 7C
BEAM PROPAGATION WHEN
POLARIZATION STATES ARE REVERSED

REVERSE DIRECTION (E TO O)

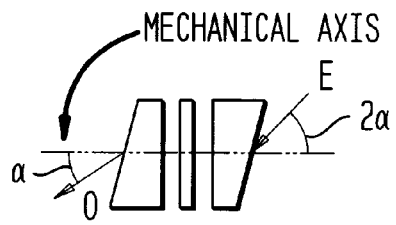

FIG. 7D
BEAM PROPAGATION WHEN
POLARIZATION STATES ARE REVERSED

REVERSE DIRECTION (O TO E)

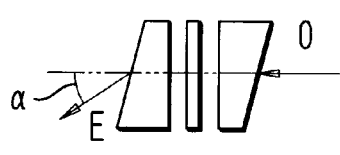

FIG. 7E
BEAM PROPAGATION WHEN
POLARIZATION STATES ARE REVERSED

REVERSE DIRECTION (O TO E)

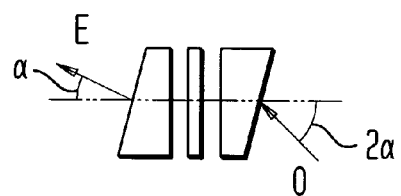

FIG. 8A
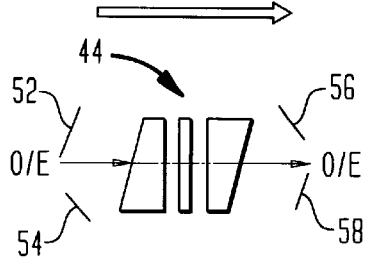
FIG. 8B
REVERSE PASS 1
(2 TO 3)
2-3 DIRECTION      2-3 DIRECTION
 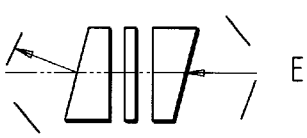
FIG. 8C
REVERSE PASS 2
(2 TO 3)
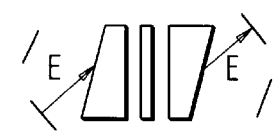 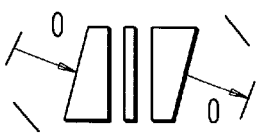
FIG. 8D
REVERSE PASS 3
(2 TO 3)
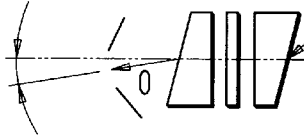 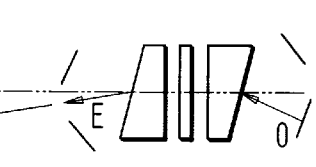
FIG. 8E
FORWARD DIRECTION
(3 TO 4)
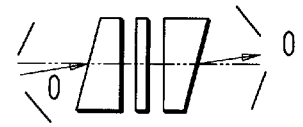 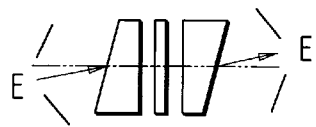

FORWARD DIRECTION 1-2 DIRECTION

REVERSE DIRECTION 2-3 DIRECTION

FORWARD E TO O

FORWARD O TO E

FORWARD O TO E,
BACK O TO E

BEAMS THROUGH f
IMAGE PARALLEL

BEAMS OUT OF f
FIBER ANGLED AND ANTI-PARALLEL

INLINE OPTICAL CIRCULATORS

CROSS REFERENCE TO RELATED APPLICATIONS

This application claims the benefit of the filing date of U.S. provisional patent application Ser. No. 60/129,647 filed Feb. 24, 1999.

BACKGROUND AND SUMMARY OF THE INVENTION

The present invention is directed to optical components for use in fiber optic networks and particularly to devices known as optical circulators.

By directing signal flow in the proper direction, optical circulators can reduce system cost and complexity in optical equipment used in fiber optic networks. In complex optical networks, passive optical components are essential elements for sorting and delivering signals to their proper destination. To accomplish this control, the optical-signal flow though the sequential ports of a circulator is guided in a fashion comparable to that of vehicles entering and leaving a traffic circle. A circulator transmits an incoming signal entering Port 1 to Port 2 while transmitting another incoming signal from Port 2 to Port 3, and another from Port 3 to Port 4 etc. The number of ports can be increased arbitrarily, and it is possible to have fully circulating devices, in which light entering the last port exits the first port, and quasi-circulating devices wherein the light from the last port does not return to the first port, this quasi-circulator is the most common type. The performance advantages of optical circulators make them indispensable for routing bidirectional optical traffic. Firstly, optical circulators are low-loss devices, unlike splitters that incrementally add 3-dB losses for each device used. Secondly, optical circulators have high adjacent port isolation and eliminate the need for external isolators.

As fiber optic communication systems increase in complexity and functionality, the demand for increased capacity and efficient (low loss) signal routing management increases. For example, in duplex (bi-directional) transmission, the conventional use of fused fiber 3 dB couplers costs the system more than 6 dB in loss. The use of optical circulators in such cases saves about 5 dB's due to the ability of circulators to route the signal in its entirety in the desired direction. Optical circulators are also important and enabling components in ADD/DROP applications. Optical circulators are forecast to play a significant role in duplex transmission, optical time domain reflectometry (OTDR) measurement systems, wavelength division/multiplexing (WDM) transmission systems and Erbium (Er) doped fiber amplifiers (EDFA).

Conventional fiber optic circulators are generally bulky and complex in design. This is caused by the fact that these designs offset the returning beam with respect to the forward beam, leading to the necessity of one collimating lens per port or fiber. FIG. 1 illustrates a conventional four port fiber optic circulator, it is seen that there are four collimating lenses (one for each of the optical fibers) and that, in this example, each fiber is disposed at a 90° angle to each other. As is shown in FIG. 1 the light from port 1 is directed to port 2, the light from port 2 is directed to port 3, and the light from port 3 is directed to port 4. The use of prisms and reflectors is seen to result in a relatively bulky design. Furthermore the complexity of such designs means that alignment of the various fibers, lenses, reflectors and optical components is time consuming and thus contributes to the expense of the circulator. Examples of this type of circulator is found at U.S. Pat. No. 4,464,022 to Emkey; U.S. Pat. No. 5,212,586 to Van Delden and U.S. Pat. No. 5,818,981 to Pan et al.

The present invention is directed to an optical circulator of the inline type which provides a more compact circulator by displacing the beams in angle instead of position. This has the advantage of using one collimating lens per two or more fibers with all of the input and output fibers lying parallel to each other. The reduction in component count also greatly simplifies the necessary alignment of the components and thus reduces cost. FIGS. 2 illustrates schematically the principle of the inline circulator displacer. FIG. 2a shows transmission from optical fiber 1 to fiber 2 (this is called the forward direction). Light exiting fiber 1 is collimated by the input lens and passes through the circulator parallel to the input. This beam couples, through the output lens, with fiber 2. Light launched from fiber 2 will be collimated through the output lens (acting now as an input lens) and passes through the circulator displacer (this is called the reverse direction). Now the propagation direction through the displacer is opposed to that of the previous situation (from fiber 1 to 2). This leads to an angular displacement of the beam exiting the displacer with respect to the beam entering it. This displaced beam will now pass through the input lens and couple optimally with fiber 3 as shown in FIG. 2b. Launching from fiber 3, the circulator displacer will not deviate this beam as the propagation direction is the same as launching from fiber 1 but the beam enters at an angle. Now the light from fiber 3 will couple with fiber 4. In this case the separation of fiber 1 and 3 is the same as that of fibers 2 and 4 as shown in FIG. 2c. It is seen that fibers 1 and 2 are collinear, with fiber 3 being disposed parallel to and lower than fiber 1 and fiber 4 being disposed parallel to and above fiber 2. Additional fibers would be disposed in a similar manner i.e. odd numbered fibers lying parallel to and below that of fiber 1 and even number fibers lying parallel to and below that of fiber 2.

In the following discussion, all diagrams will describe inline circulator displacers. This assumes that the light is launched from the fiber and collimated through an input lens and further on imaged back into a fiber using an output lens, these components are not shown in the following drawings for the sake of clarity but should be assumed to be present.

A variety of approaches to providing inline optical circulators have been taken, in U.S. Pat. Nos. 5,909,310 and 5,930,039 to Li et al illustrate inline optical circulators that utilize two birefringent displacers, a birefringent wedge set (oppositely disposed wedges of birefringent material that have their optical axes oriented orthogonally to each other and to the direction of beam propagation) together with Faraday rotators, ½ wave plates and an birefringent beam path deflector". U.S. Pat. No. 6,014,475 to Frisken describes an inline optical circulator that utilizes multiple birefringent displacers, a birefringent wedge (in one embodiment) together with Faraday rotators, ½ wave plates and one or more "imaging" means (a compound lens). The more components that are disposed in the beam path of a circulator, the more critical the alignment of each component with respect to the others becomes. Even very small misalignments can cause loss of efficiency or total failure of the circulator, the requirement for complex alignment procedures will increase the cost of the device and render certain designs impractical. The use of waveplates in the circulators increases the wavelength sensitivity, which can be problematic as WDM systems become more commonplace. The present invention is directed to providing optical circulators that reduce component count and hence cost, the present devices are designed so that alignment is straightforward and can be implemented without waveplates.

The present invention is directed to embodiments for an inline optical circulator utilizing birefringent displacers to split an incoming beam into two orthogonally polarized beams and thereafter to recombine the beams. The birefringent displacers are used in combination with non reciprocal devices (Faraday rotators), reflectors and waveplates and serve to route a signal serially to the next port. Specific embodiments utilize birefringent wedges which provide circulators with reduced component counts and simplified alignment of the components. Circulators which do not utilize waveplates and thus are relatively wavelength insensitive are also described.

BRIEF DESCRIPTION OF THE DRAWINGS

For a better understanding of the invention, reference is made to the following drawings which are to be taken in conjunction with the detailed description to follow in which:

FIG. 7 illustrates the operation of birefringent wedges.

FIG. 8 illustrates an optical circulator using reflectors and birefringent wedges.

DESCRIPTION OF THE PREFERRED EMBODIMENTS

Figure 3:
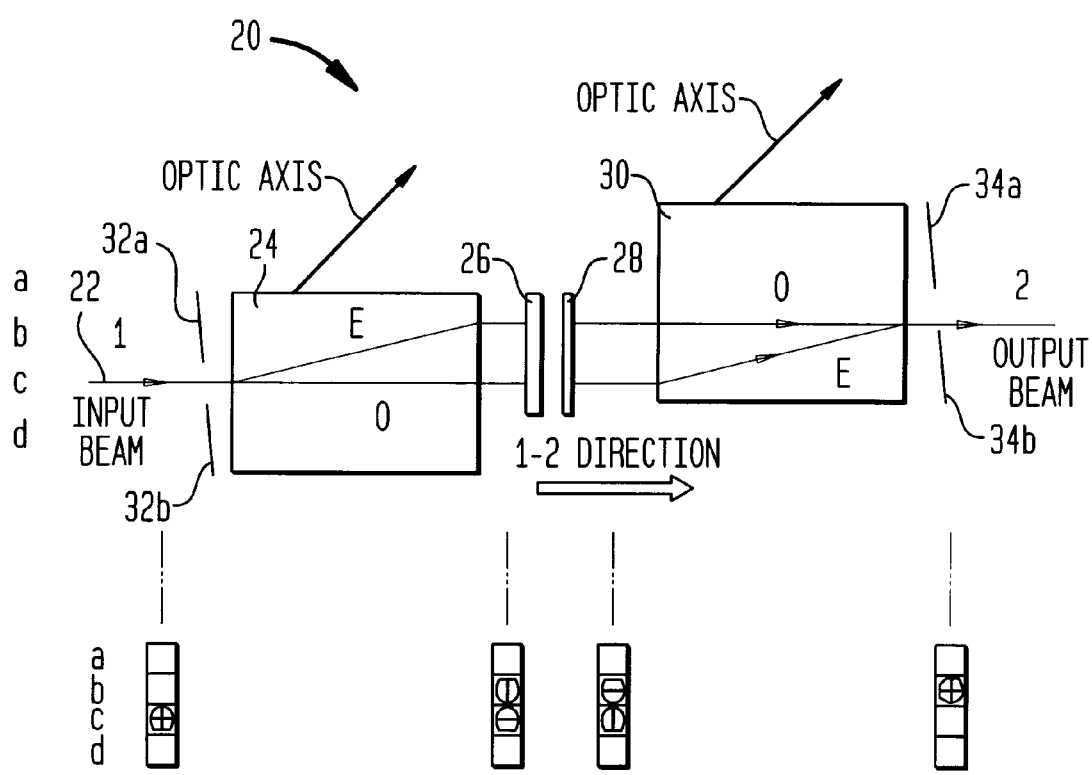
FIG. 3 illustrates an optical circulator using reflectors and birefringent displacers.

FIG. 3 illustrates a first embodiment of a circulator 20 using reflectors and birefringent beam displacers. In FIG. 3 light travels from a fiber 1 to a fiber 2. A beam 22 collimated by a collimating lens (not shown) is launched into an input birefringent displacer 24 and split into two orthogonal polarization states (called "Ordinary" O and "Extraordinary" E which are separated in space), the optic axes of the birefringent displacers are optimized for maximum separation of the O and E beams. The "O" and "E" beams then travel through a 45° Faraday rotator 26 and thereafter to a ½ waveplate 28, resulting in a 90 rotation of both ("O" & "E") polarization states as waveplate 28 is tuned for a 45° rotation. The two beams then enter the output birefringent displacer 30 which recombines the two polarization states into one beam, containing both polarization states. The beam position and polarization indicators (located at the bottom of FIG. 3) show a view of the beam position and its corresponding polarization state looking along the propagation direction of the beam, as indicated by the arrows. As seen in position indicators the output has combined polarization states and shifted upward one position which is where fiber 2 lies. Birefringent displacers 24, 30 have indices of refraction which differ depending on the polarization of the beam that passes through them and are constructed from the standard birefringent materials known in this art such as Lithium Niobate $LiNbO_3$, Rutile (crystalline $TiO_2$) and Yttrium Vanadate $YVO_4$, other birefringent materials can also be used.

Figure 4A:
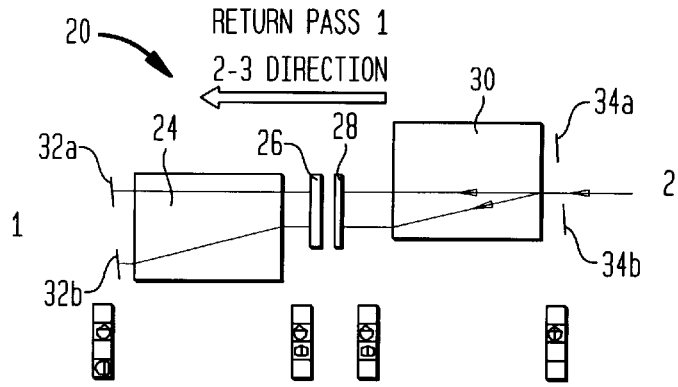
FIG. 4 illustrates the operation of the optical circulator of FIG. 3.
Figure 4B:
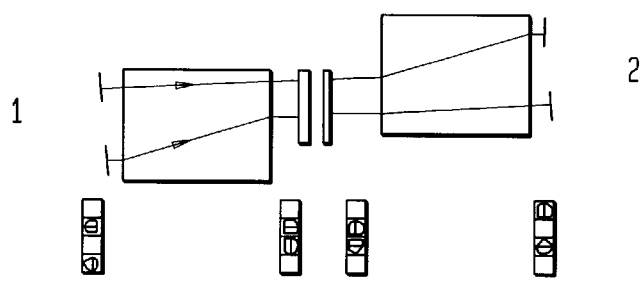
Figure 4C:
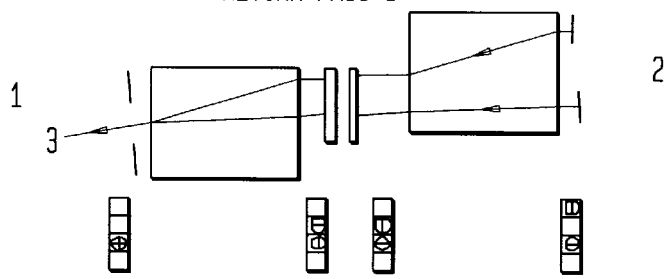

FIGS. 4a to 4c illustrate the pass from fiber 2 (port2) to fiber 3 (port3) in the device of FIG. 3, in this regard it is to be borne in mind that the passage from port 2 to port 3 requires three passes through circulator 20. The multiple passes are accomplished with the use of a pair of input reflectors 32a, 32b and a pair of output reflectors 34a, 34b which are disposed as shown in the drawings with input reflectors 32a, 32b being parallel to each other and output reflectors 34a, 34b being parallel to each other. FIG. 4a (return pass 1) illustrates a beam launching from fiber 2. On this pass the two "O" & "E" polarization will have a net 0° rotation as the rotation of waveplate 28 is countered by the opposite rotation of Faraday rotator 26. In this regard it is noted that a Faraday rotator is a non reciprocal device. That is, a beam traveling from right to left (i.e. port 2 to port 3) will be rotated differently than a beam traveling from left to right. When exiting the input birefringent beam displacer 24 both beams will be displaced with respect to input beam launched from fiber 1. These two beams can now reflect off of input reflectors 32a, 32b.

On return pass 2 (FIG. 4b) the polarization states will be rotated 90° when passing through Faraday rotator 26 and waveplate assembly 28, this is similar to that of launching from fiber 1. When the two beams ("O" & "E") exit output beam displacer 30 they will be displaced with respect to the beam launched from fiber 2. These two beams will now reflect off of the output reflectors 34a, 34b. On return pass 3 (FIG. 4c) the two beams, with orthogonal polarization states, will be recombined into one beam. However if the input and output reflectors are angled in a proper fashion this beam (launched from fiber 2) will exit circulator displacer 20 at an angle with respect to the input beam (launched from fiber 1) such that the exiting beam will enter fiber 3.

Figure 4D:
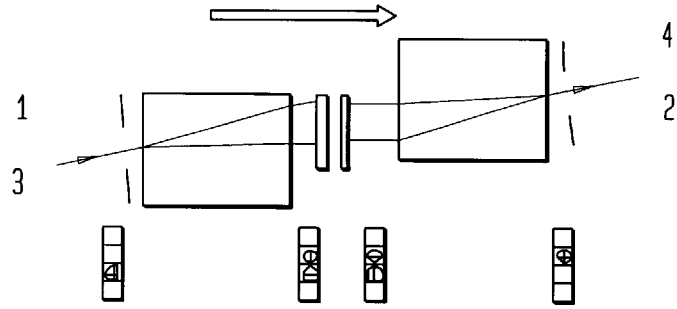

FIG. 4d shows the situation when launching from fiber 3. This situation is very similar to that of launching from fiber 1 in that the beam will stay parallel to the input beam, when passing through the circulator displacer. However, in this case the beam exiting fiber 3 enters birefringent displacer 24 at an upward angle and thus it will exit birefringent displacer 30 at an upward angle so that it will couple into fiber 4.

Figure 5:
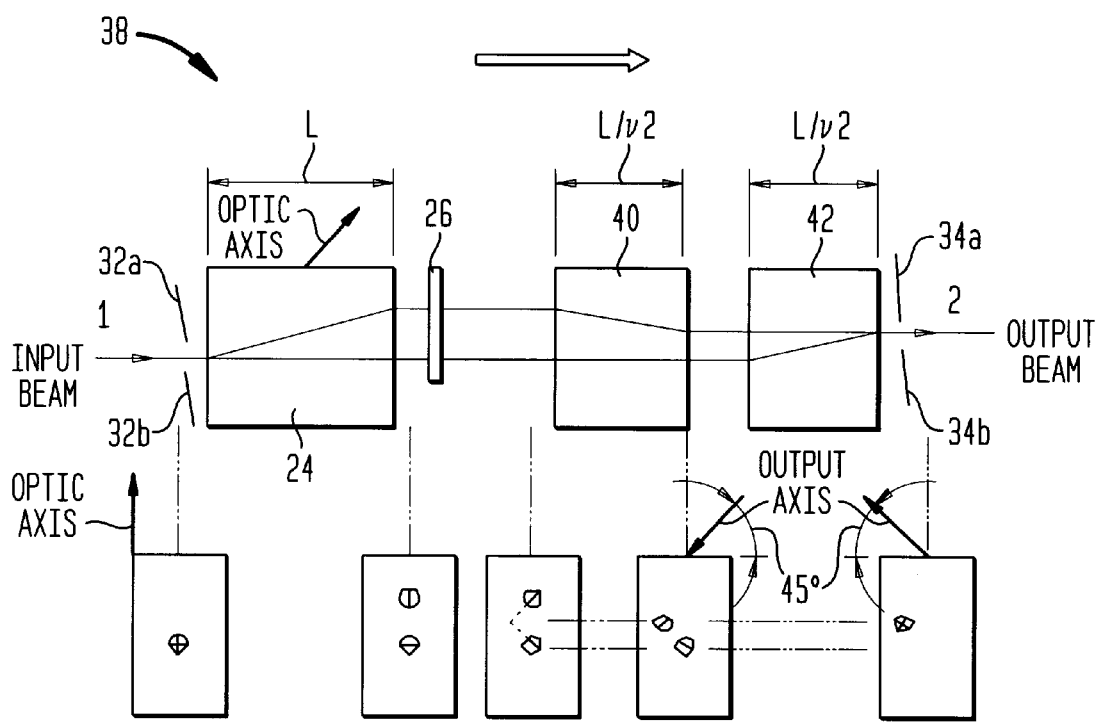
FIG. 5 illustrates an alternative optical circulator to the design of FIG. 3 that does not use waveplates.

The circulator approach shown in FIGS. 3 and 4 uses a Faraday rotator and waveplate to rotate the beams. However waveplate performance is wavelength dependent. This can be problematic particularly when the fibers are used in WDM applications, wherein light of differing wavelengths is carried by the optical fibers. An alternative circulator 38 using a birefringent beam displacer instead of a waveplate is shown in FIGS. 5 and 6, this provides a less wavelength sensitive design, due to the relative wavelength independence of the displacers. FIG. 5 illustrates light traveling form fiber 1 to fiber 2 and corresponds to FIG. 3 with the same reference numbers used to indicate the same components. It is seen from a comparison of FIGS. 3 and 5 that waveplate 28 has been eliminated and that birefringent displacer 30 has been replaced by two birefringent displacers 40, 42 each of which have a length $L/(2)^{-\frac{1}{2}}$ where L is the length of birefringent displacer 24. The optical axes of birefringent displacers 40,42 are disposed orthogonal to the axis of the light beams with the optical axis of birefringent displacer 40 shifted 45° clockwise from vertical and optical axis of birefringent displacer 42 shifted 45° counterclockwise from vertical and thus at 90° from each other. This means that displacement of the beams occurs in two planes instead of one as shown by the beam position and polarization indicators located at the bottom of FIG. 5.

Figure 6A:
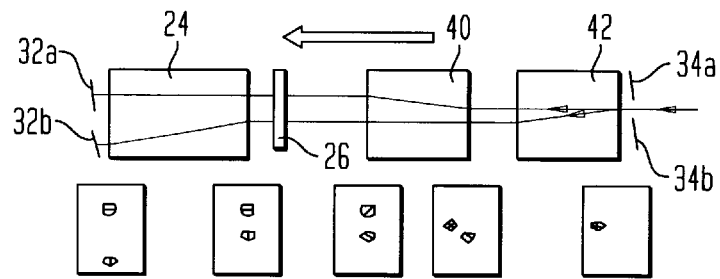
FIG. 6 illustrates the operation of the optical circulator of FIG. 5.
Figure 6B:
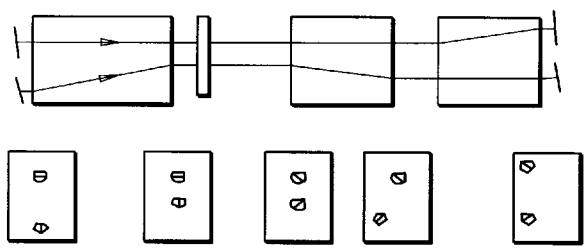
Figure 6C:
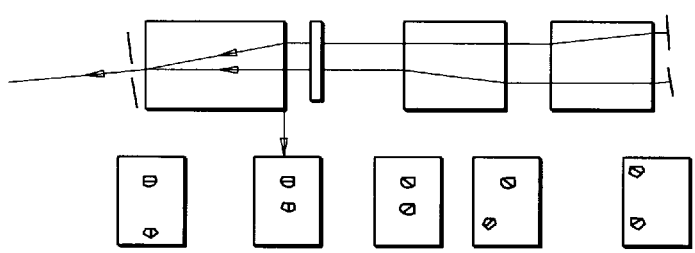
Figure 6D:
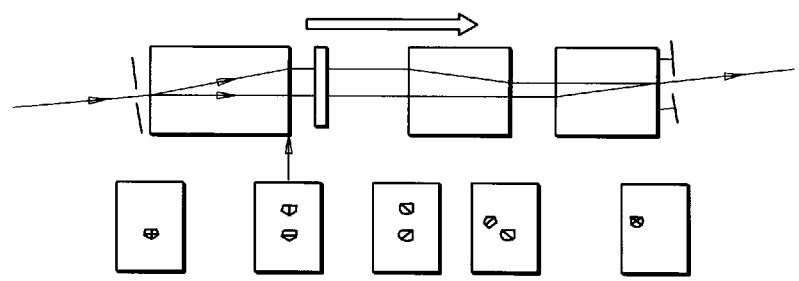

FIGS. 6 (a to d) show the forward and return passes of this design and correspond to FIGS. 4a to d and show the path from fiber 2 to fiber 3 in FIGS. 6a to 6c. The path again requires three passes through circulator 38 with the aid of input reflectors 32a, 32b and output reflectors 34a, 34b. The pass from fiber 3 to fiber 4 shown in FIG. 6d is a single pass in the forward direction. However, in this case the beam exiting fiber 3 enters birefringent displacer 24 at an upward angle and thus it will exit birefringent displacer 42 at an upward angle so that it will couple into fiber 4.

Birefringent displacers of the types described above suffer a disadvantage in that the length of the displacers in practical applications tend to be relatively long which, depending on the cost of the material selected, leads to increased cost and a relatively large circulator. The use of birefringent material shaped as a wedge, known as a birefringent wedge can provide a more compact design. When a pair of birefringent wedges is combined with a Faraday rotator a particularly compact circulator can be achieved, FIG. 7a shows a birefringent assembly 44 comprising two birefringent wedges 46,48 with optic axes disposed at 45° with respect to each other (both optical axes are normal to the beam direction) and a 45° Faraday rotator 50 disposed therebetween. In this case a beam propagating in the forward direction will have its polarization states maintained with respect to birefringent wedges 46,48 ("O" stays "O" and "E" stays "E" with respect to the birefringent wedges). If the beam travels in the opposite direction the polarization states will be reversed ("O" will become "E" and vice versa), see FIGS. 7d and 7e. This means that if light is launched in the polarization state preserving direction (forward direction), the "O" and "E" beams will exit wedge set 44 parallel to each other and parallel to the incident beam. In the other case where "O" and "E" are switched (the reverse direction), the "O" and "E" polarization states will exit this configuration at an angle with respect to the forward direction beam, however "O" and "E" will not be parallel to each other. Furthermore, in the reverse direction "E" and "O" beams entering at an angle of 2α will exit at an angle of α(FIGS. 7d and 7e). Consider FIG. 7a and 7b or 7d; a polarization dependant or polarization maintaining, optical circulator can be made using these wedges. The beampath from fiber 1 to fiber 2 is straight (no angle change), from fiber 2 to fiber 3 the beampath will make an angle of α with respect to the incoming (1 fiber to fiber 2) beampath, but of course only for the O or E polarization state.

An optical circulator utilizing birefringent assembly 44 is illustrated in FIG. 8a. A circulator design using birefringent wedges is very similar to one using birefringent displacers, as described and uses input reflectors 52, 54 and output reflectors 56, 58 which are non parallel and tilted in such a manner that the two polarization states will recombine and exit the system at an angle with respect to the forward beam. When coupling from fiber 1 to 2 the beam will exit the circulator displacer parallel to the input beam (FIG. 8a). Coupling from fiber 2 to 3 the beam is again reflected back and forth three times (FIGS. 8a to 8d) to recombine the O and E polarization states. In this situation the beams will not emerge parallel to each other but at an angle therefore each beam requires that reflectors 52, 54, 56 and 58 be used to return the beams. The forward direction pass from fiber 3 to fiber 4 is a single pass and is shown in FIG. 8e. The design of FIG. 8 has the advantage of not being wavelength sensitive as it does not use waveplates.

Figure 9A:
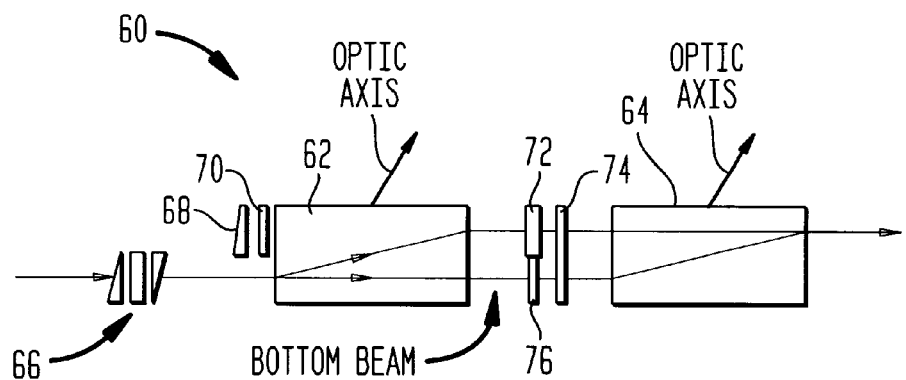
FIG. 9 illustrates a first embodiment of an optical circulator using birefringent displacers and birefringent wedges.
Figure 9B:
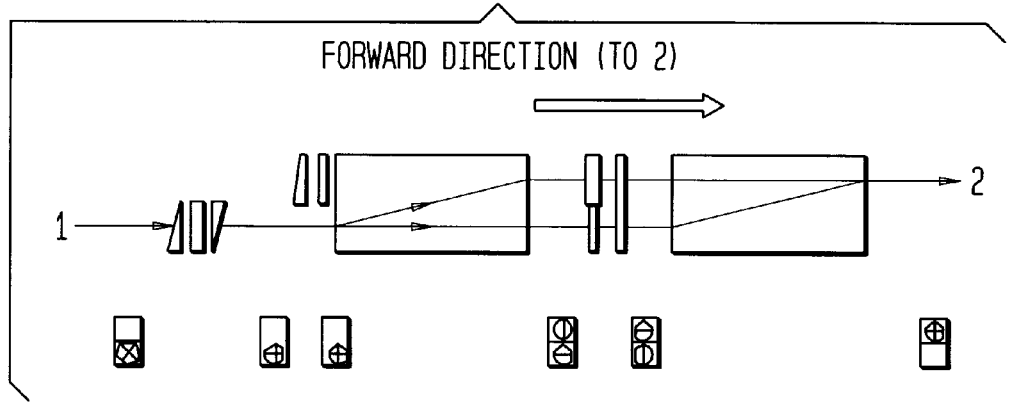
Figure 9C:
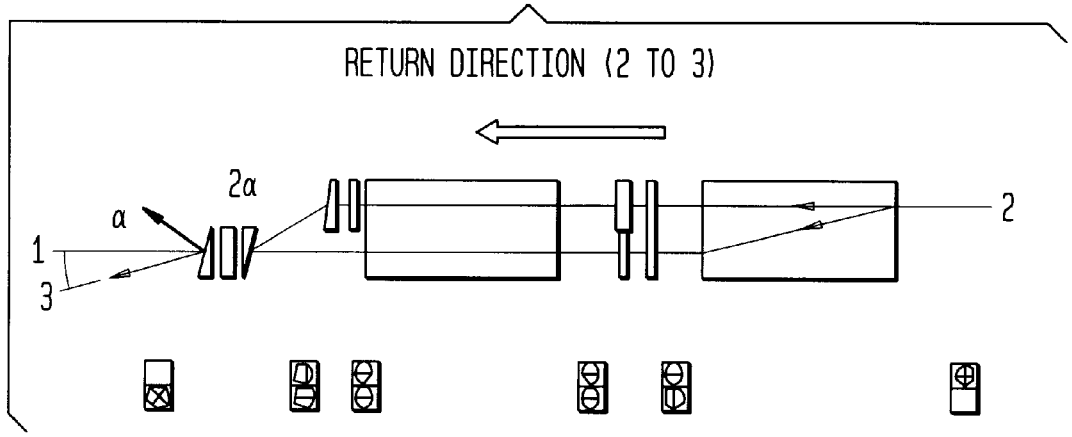

An optical circulator 60 using both birefringent displacers and birefringent wedges is illustrated in FIG. 9. Circulator 60 includes birefringent displacers 62,64 whose optical axes are oriented to provide maximum beam separation, to separate the beams into "upper" and "lower" beams in whose path differing optical components can be placed. Spaced apart from birefringent displacer 62 at the input side in the lower path is a birefringent assembly 66 comprising two birefringent wedges and a Faraday rotator. Birefringent assembly 66 is similar to that described with respect to FIG. 7 with the wedges having their optic axes at 45° with respect to each other and perpendicular to the incident beam. Furthermore the wedge of assembly 66, facing birefringent displacer 62 will have its optic axis aligned such that it will be in one plane with the optic axis of birefringent displacer 62, this to assure that all power is coupled into beam 3 and not into beam 1, as shown in FIG. 9c.

On the input side of, and proximate to, birefringent displacer 62 is a birefringent wedge 68 and a ½ waveplate 70. Waveplate 70 is a ½ waveplate oriented to rotate the polarization state of the upper beam 90°, while birefringent wedge 68 is used to bend the upper beam towards assembly 66 as shown in FIG. 9c. Disposed between birefringent displacers 62,64 in the upper beam path, are a Faraday rotator 72 and a ½ waveplate 74. Located between birefringent displacers 62,64 in the lower beam path, are a ½ waveplate 76 and the lower part of ½ waveplate 74.

This design makes use of the fact that when using a set of birefringent wedges, both O and E states can be recombined in the reverse direction when for instance O is launched parallel to the mechanical axis and the E beam makes an angle with the mechanical axis of 2α ( α being the angle the beam makes with the axis, when launching in the reverse direction parallel to the mechanical axis), this is shown in FIG. 7c and 7d. In the forward direction shown in FIG. 9b both beams containing both polarization states exit wedge/Faraday rotator assembly 66 parallel to the input beam (see FIGS. 9a and b). These beams then enter birefringent displacer 62 and are split into two orthogonal polarization states located in the upper and lower beam paths. Here one state (the upper beam) passes through Faraday rotator 72 and waveplate 74, producing a net rotation of the polarization state of 90°. The other state (the lower beam) passes through waveplates 76 and 74 and is thus also rotated 90°. Both states are now recombined by output birefringent displacer 64 and coupled into fiber 2.

In the reverse direction (i.e. the path from fiber 2 to fiber3) shown in FIG. 9c, the upper beam polarization will not be rotated, due to Faraday rotator 72 and waveplate 74, the lower beam will be rotated by 90°. The upper beam can now pass through ½ waveplate 70 and birefringent wedge 68 which will angle the beam at the desired 2α. Both beams will now recombine when they pass through the birefringent wedge set 66 coupling into fiber 3 by exiting birefringent wedge set 66 at an angle. The beampath of fiber 3 to fiber 4 will follow the same path as fiber 1 to fiber 2 but at an angle α with respect to the beampath of fiber 1 to fiber 2.

Another embodiment of an optical circulator 78 using birefringent displacers and wedges is illustrated in FIG. 10. This design places the birefringent wedges and Faraday rotators between a pair of birefringent beam displacers rather than outside. Circulator 78 includes birefringent displacers 80,82 whose optical axes are again oriented to provide maximum beam separation, to separate the beams into upper and lower beams having two orthogonal polarization states. Located between birefringent displacers 80,82 is an assembly 83 which includes two Faraday rotators 84, 86 which extend so as to intercept both the upper and lower beams. Assembly 83 also includes birefringent wedges 88, 90 disposed on each side of Faraday rotator 86 form a birefringent wedge set for the upper beam and birefringent wedges 92, 94 disposed on each side of Faraday rotator 86 form a birefringent wedge set for the lower beam. The wider portion of birefringent wedge 88 is disposed downwardly and the wider portion of birefringent wedge 90 is disposed upwardly in the upper wedge set while the wider portion of birefringent wedge 92 is disposed upwardly and the wider portion of birefringent wedge 94 is disposed downwardly in the lower wedge set. The optic axes of the touching wedges (88,92) and (90,94) are parallel to each other.

Figure 10A:
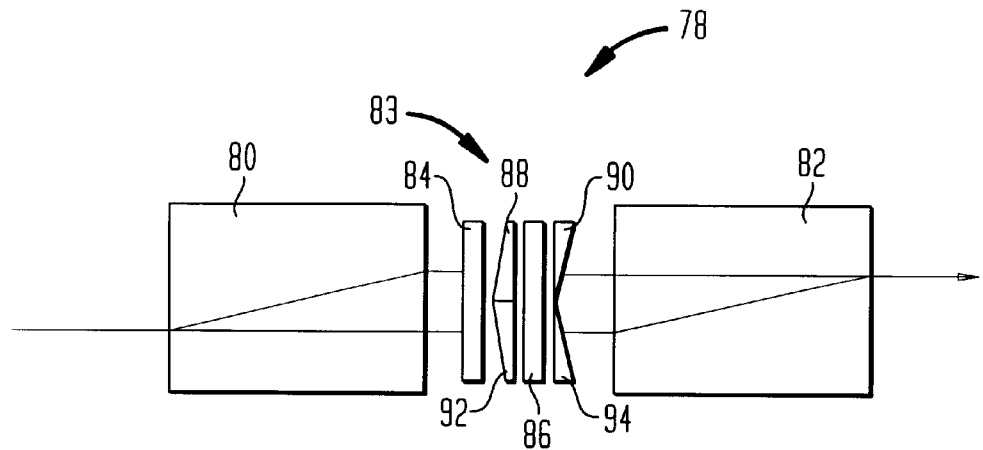
FIG. 10 illustrates a second embodiment of an optical circulator using birefringent displacers and birefringent wedges.
Figure 10B:
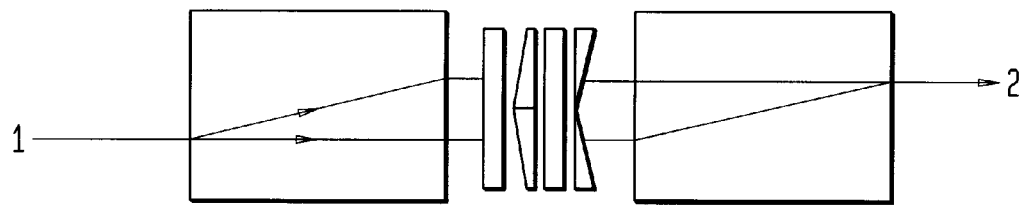
Figure 10C:
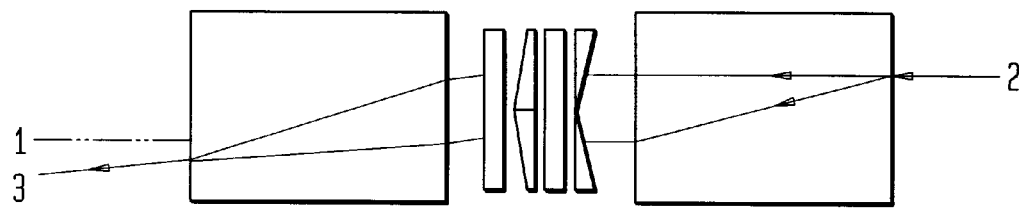

FIG. 10b shows the forward path from fiber 1 to fiber 2. The beam launched from fiber 1 is separated into two orthogonally polarized beams by birefringent displacer 80 the two beams then travel through wedge/Faraday rotator assembly 83, which preserves their polarization states with respect to the wedges, and emerge parallel to the input beam and shifted up in position. These two beams are now recombined in output birefringent displacer 82 and coupled into fiber 2 (FIGS. 10a and 10b). On the path from fiber 2 to 3 shown in FIG. 10c, the beam launched from fiber 2 is separated into two orthogonally polarized beams by birefringent displacer 82 the two beams will now pass through wedge/Faraday rotator assembly 83 in the direction that does not preserve their polarization states. This leads to an angular deviation of the beams with respect to the input beam, as explained in FIG. 7. As each polarization state has its own wedge set the deviation will be in the same direction for both beams. The two beams will now recombine in birefringent displacer 80 and emerge parallel to each other when exiting the input displacer at an angle so as to impinge on fiber 3. The beampath from fiber 3 to fiber 4 follows that of fiber 1 to fiber 2 except that it's at an angle α with respect to the fiber 1 to fiber 2 beampath.

The optical circulator design of FIG. 10 is a compact inline design which requires only a single pass in each direction and does not utilize waveplates. A variant of the design of FIG. 10 with the birefringent wedges placed between the Faraday rotators is shown in FIG. 12. This design makes use of the fact that birefringent wedges, with their optical axis perpendicular to each other and perpendicular to the light propagation direction will split the orthogonal polarization states in angle. The advantage of this layout is that the angle between the incoming beampath and returning beampath is 2α instead of α as is the case for the design of FIG. 10, this can make the device design easier in choice of wedge material, lenses, size, and the like. First an explanation of the use of these birefringent wedges using FIG. 11 will be given.

Figure 11A:
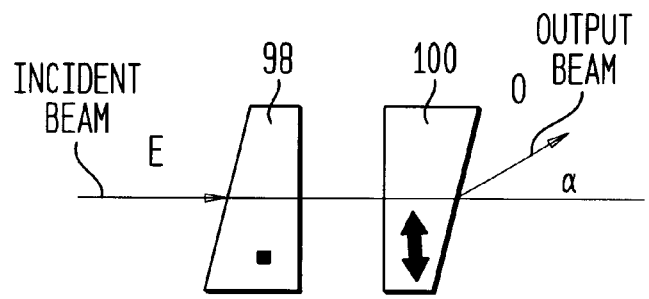
FIG. 11 illustrates the O and E paths through birefringent wedges.

In FIG. 11a a first birefringent wedge 98 has an optical axis extending through the plane of the paper (indicated by the dot showing the tip of an arrow showing polarization direction) and a second birefringent wedge 100 has an optical axis extending vertically in the plane of the paper (indicated by the arrow). As such the optical axes of wedges 98 and 100 are orthogonal to the direction of the incident beams and to each other. FIG. 11a shows a situation were light is launched into birefringent wedge 98, of which the polarization state is parallel to the optical axis of this wedge (designated E for extraordinary polarization state with respect to wedge 98).

Figure 11B:
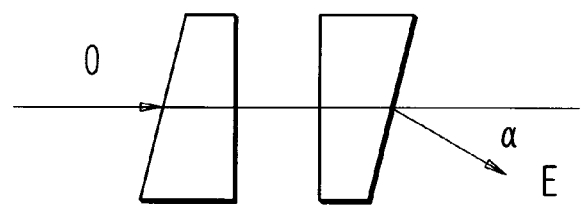

The orientation of the O and E beam with respect to the incident beam and wedge orientation depends on the material used for the wedges, however independent of the material, the beams will lie on opposite sides of the incident beam. Wedge 100 has its optical axis perpendicular to that of the wedge 98, so that the beam will now have an Ordinary O polarization state with respect to wedge 100. Due to the difference in refractive index associated with the polarization states, the beam direction will now be diverted with respect to the incident beam, resulting in the exiting beam having an angle α with respect to the incident beam. If an ordinary O polarization state is launched into wedge 98, then the beam divergence will be a mirror image of the previous situation, this is shown in FIG. 11b.

Figure 11C:
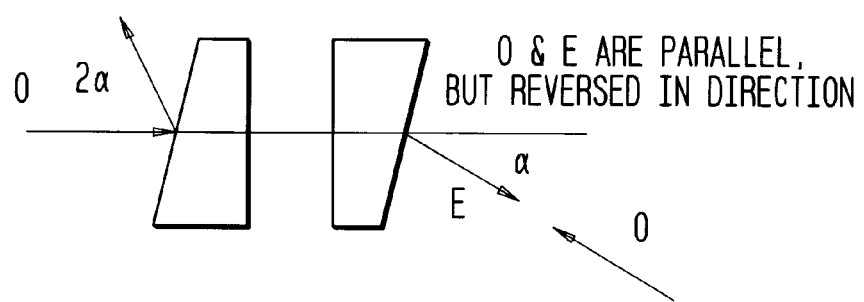

In FIG. 11c both situations are combined. If O is launched into wedge 98 it will exit wedge 100 as E, at an angle α with respect to the incident beam. If this beam is reversed and changed in polarization state from E to O it will exit wedge 98 at 2α with respect to the incident beam. This reversing of the polarization states can be accomplished by placing a Faraday rotator after the two wedges.

If both polarization states are launched into the wedge set of FIG. 11, then both polarization states will be separated in angle and not recombine in a manner that allows both of them to coupling back into a single fiber simultaneously. In order to make this a polarization independent circulator, the incident beam will have to be split into its two orthogonal polarization states and transmitted through a wedge set independently. This is described below.

In FIG. 12 two birefringent beam displacers 102, 104 with the optical axis optimized so as to give as large a separation as possible between the two orthogonal polarization states can be used to create space to place a Faraday rotator and a birefringent wedge set in between. Disposed between birefringent displacers 102, 104 are Faraday rotators 106, 108 and an upper wedge set 110,111 and a lower wedge set 112,113 which are both oriented the same as that illustrated in FIG. 11. In order for the beams to recombine in the forward and reverse directions, the polarization states must be rotated by 90° between displacers 102,104 and the optical axis of both displacers must be parallel, resulting in the O beam in the input displacer becoming an E beam in the output displacer and an E beam becoming an O beam. This arrangement has the advantage of having no optical path length (OPL) difference between the two polarization states, thus avoiding polarization mode dispersion (PMD). An alternative design would have a net 0° polarization rotation (the O beam in input displacer stays as an O beam in output displacer, and the E beam stays as an E beam), with the optical axis of the displacers mirrored in the beam path. This will recombine both beams, but result in a large PMD.

Figure 12A:
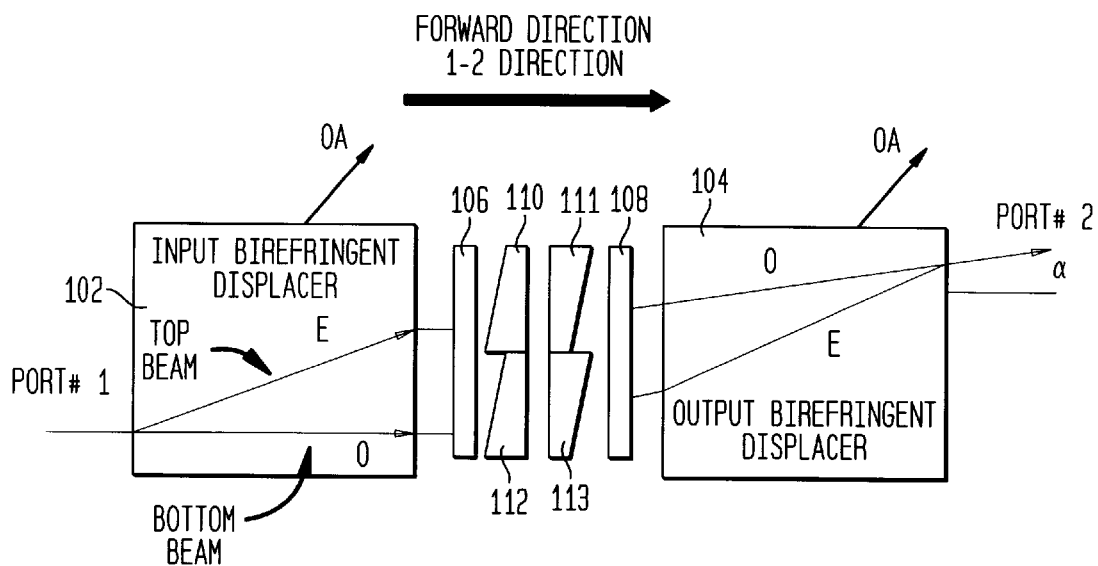
FIG. 12 illustrates a third embodiment of an optical circulator using birefringent displacers and birefringent wedges.
Figure 12B:
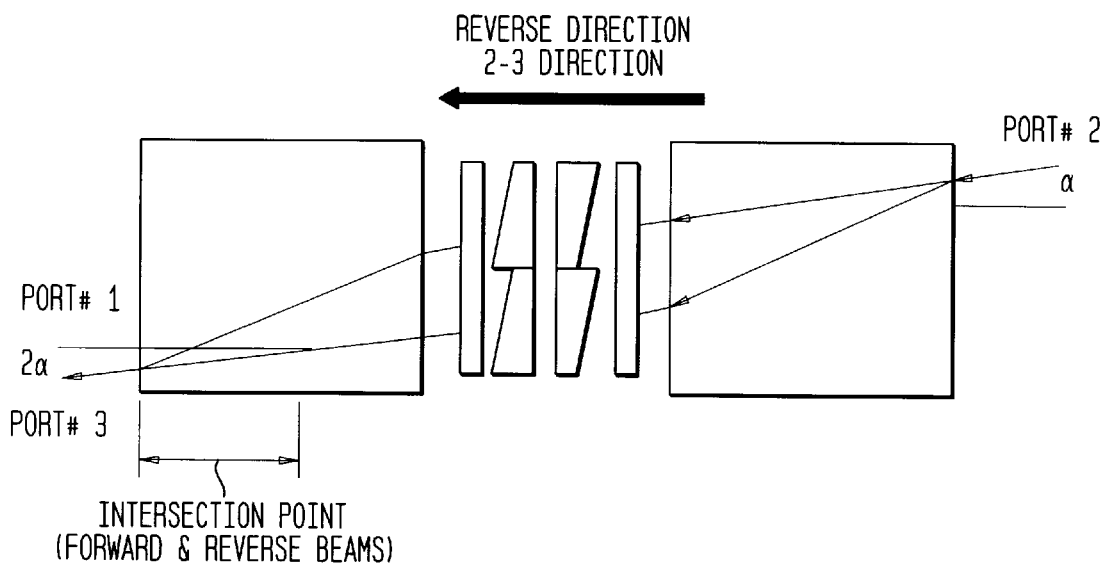

FIG. 12a shows the light traveling in the forward direction from ports (fibers) 1 to 2. Upon entering input birefringent displacer 102 the beam is separated into its two polarization state components (E and O with respect to displacer 102). Both polarization states are then rotated 45° by Faraday rotator 106, making both of them O states with respect to left wedges 110,112 (both top 110 and bottom 112 wedges). As described previously, the optical axis of right 111,113 wedges are at 90° with respect to left wedges 110,112 and at 90° with respect to each other (that's why the wedges are angled in the same manner). Both the top and bottom beams will now be E with respect to the right wedges, resulting in the top and bottom beams making an angle ($\alpha$) with the incident beam. Passing through the right Faraday rotator 108 the polarization states are now O and E with respect to output displacer 104 and can recombine and impinge on port 2.

In the reverse direction, from fiber 2 to fiber 3 as shown in FIG. 12b, the beam will again split into its two polarization state components and pass through Faraday rotator 108. Due to the non-reciprocal nature of the Faraday rotator, the beams will now be O with respect to right wedges 111,113 (instead of E when passing from fiber 1 to 2) and E with respect to left wedges 110,112 resulting in the beams now making an angle of $2\alpha$ with respect to the incident beam. Left Faraday rotator 106 will now rotate the polarization states another 45°, making it possible for them to recombine in the input displacer.

When launching light from fiber 3, the beam exiting output displacer 104 will make an angle $\alpha$ with respect to that from fiber 2, resulting in it making an angle of $2\alpha$ with respect the beam entering fiber 2, this can now be launched into fiber 4.

The beampath going in the same direction (1 to 2, 3 to 4, 5 to 6 etc) will follow the same route, only at angle $2\alpha$ with respect to its predecessor.

For example:

The beampath from 1 to 2 will make an angle $\theta$ with respect to the mechanical axis, The beampath from 2 to 3 will make an angle $\theta+2\alpha$ with respect to the mechanical axis, The beampath from 4 to 5 will make an angle $\theta+4\alpha$ with respect to the mechanical axis, In principle this can go on indefinitely, making this an N port circulator.

Figure 13:
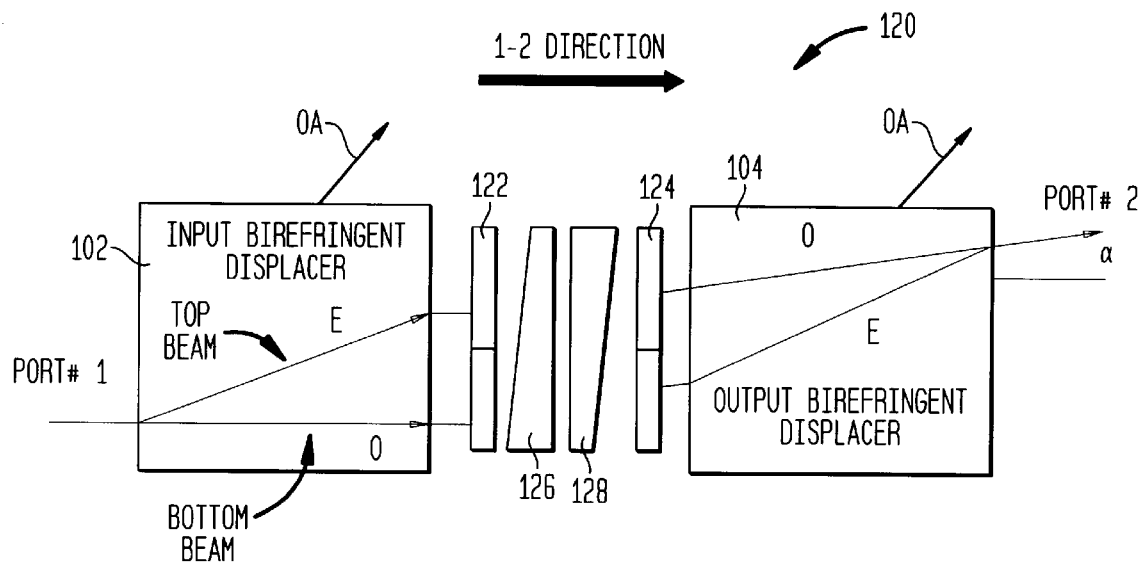
FIG. 13 illustrates a fourth embodiment of an optical circulator using birefringent displacers and birefringent wedges, this is a variation on the design shown in FIG. 12.

An alternative design to that of FIG. 12 is shown in FIG. 13 in which the same reference numbers are used to represent the same components. In the circulator 120 of FIG. 13 the Faraday rotators 106, 108 that extend across both the upper and lower beam paths are replaced with two piece Faraday rotators 122, 124 that rotate the upper beam by +45° and the lower beam by −45°. This has the advantage of requiring only one set of two birefringent wedges 126, 128; instead of four wedges 110, 111, 112, 113 as shown in FIG. 12. The principle of operation of the design of FIG. 13 is otherwise similar to that of FIG. 12.

Figure 1:
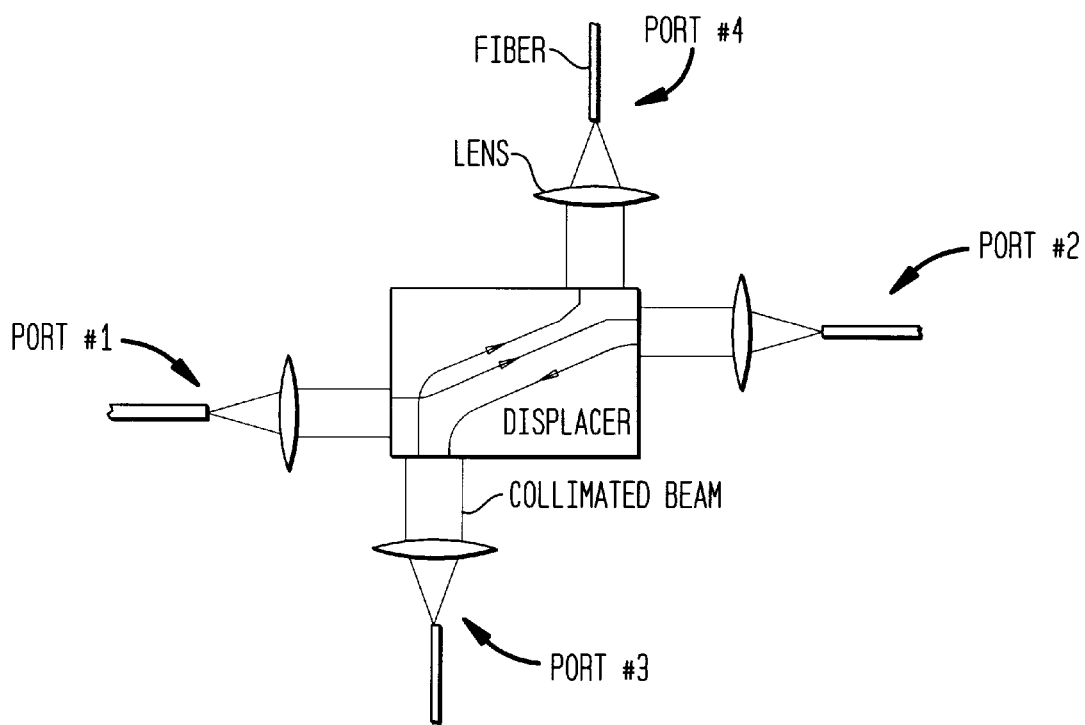
FIG. 1 illustrates schematically the configuration of a prior art optical circulator.
Figure 2A:
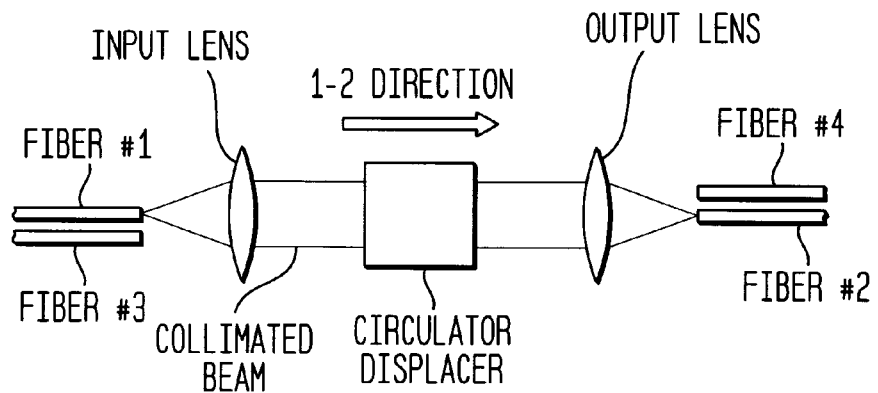
FIG. 2 illustrates the configuration of an inline optical circulator.
Figure 2B:
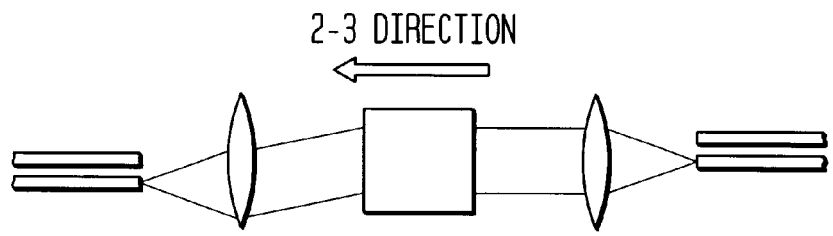
Figure 2C:
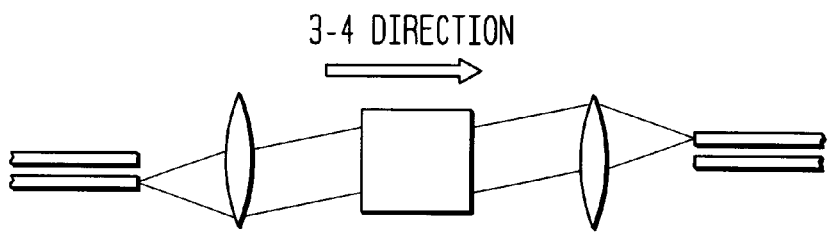

The circulators shown in FIGS. 12 and 13 provide compact, wavelength insensitive designs suitable for many applications. However, the alignment between the optical fibers, the collimating lens, the birefringent displacers and wedges and Faraday rotators is critical. In order for these designs to be more alignment and tolerance insensitive, and thus less expensive to manufacture and maintain, two issues need to be resolved:

1. The tolerance on the focal length of the collimating lenses, radial separation between fibers 1 and 3, 2 and 4 etc. (see FIG. 2), and tolerance on the wedge angle and other components, must accurately conform to design specifications. If not, the images will not line up with the fiber cores, resulting in excessive insertion losses.

2. The intersection point of the forward and returning beams (see FIG. 12b), if both beams are to be parallel after exiting the collimating lens this intersection point needs to be in the focal plane of the collimating lens. This can be difficult due to the length of the birefringent displacers.

Figure 14:
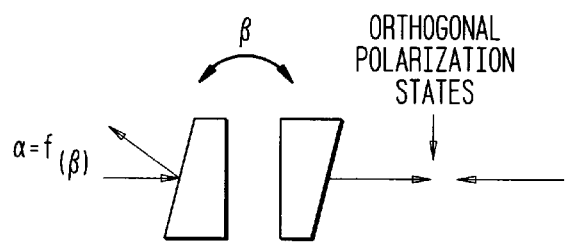
FIG. 14 illustrates the tuning of the angular separation of the beam paths by adjustment of the birefringent wedges.

The first issue, variations in the collimating lens focal length, wedge angle and fiber separation, can be resolved by tilting (tipping) the wedges with respect to the beams. This tilting has the effect of varying the angle between the forward and returning beam $\alpha$(this angle is designated, and is a function of the tilt angle $\beta$, see FIG. 14), thus compensating for these variations. Another method for compensating for the above-mentioned tolerances is by using a compound collimating lens assembly. With a proper choice of collimating lenses, varying the lens separation will change the focal length, thus compensating for fiber separation and wedge angle tolerance. Obviously this will have to be done on both sides of the device in order to maintain a magnification of unity.

Figure 15A:
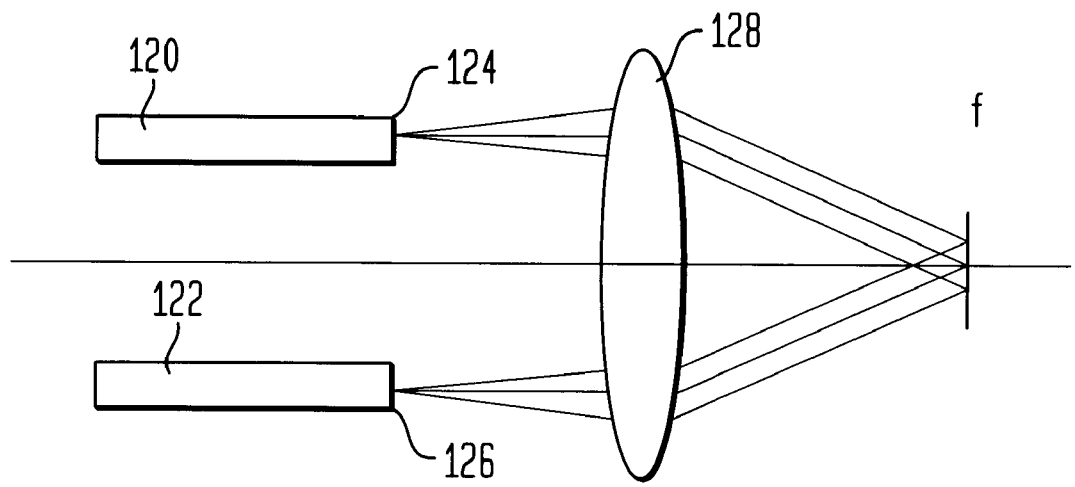
FIG. 15 illustrates the adjustment of the focal point of the beam paths by modification of the angle of the fiber ends.
Figure 15B:
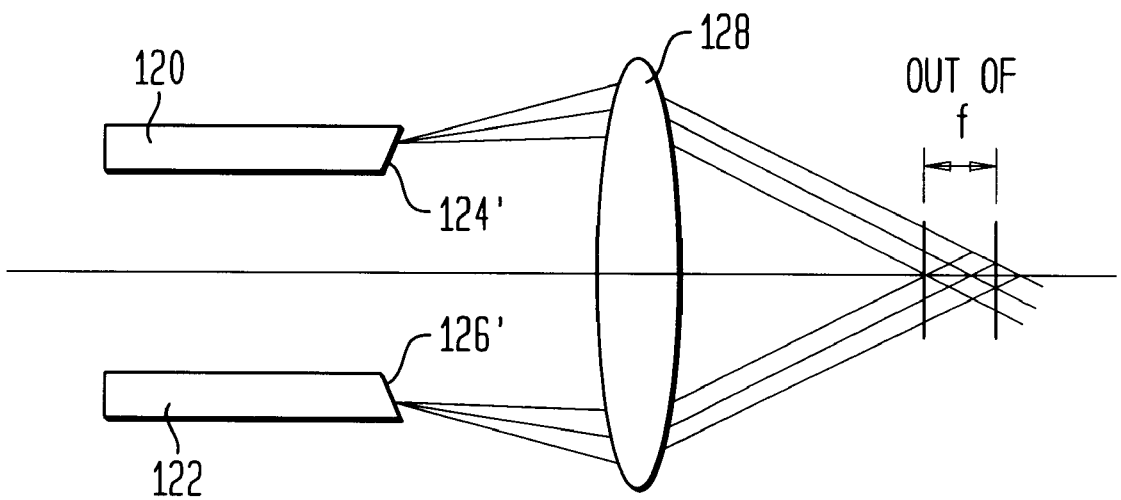

For the second issue, if the intersection point of the two beams is removed from the focal plane, the images formed by the lens will be at an angle with respect to each other. In FIG. 15a shows parallel optical fibers 120, 122 disposed on each side of the optic axis, which have square cut ends 124,126; parallel to each other. The beams emanating from fibers 120, 122 will be collimated by a lens 128 and intersect in f. In FIG. 15b the ends 124', 126' of the fibers 120,122 are now polished at an angle and positioned anti-parallel with respect to each other. The intersection point of the beams can now be displaced along the optic axis by changing the angle of the fiber ends. The angle of the ends is generally small (about 6–10°) but can be varied depending on requirements of the particular circulator. This intersection problem can also be resolved by using a compound collimating lens design. However, the use of anti parallel fiber ends is simpler and less expensive.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. An inline optical circulator, for at least three optical fibers comprising:
   a first birefringent displacer for separating an input beam into upper and lower beams said upper and lower beams being orthogonally polarized with respect to each other;
   a second birefringent displacer for combining said upper and lower beams into a single beam;
   first and third ports disposed proximate said first birefringent displacer to launch light beams from said first and third optical fibers into said first birefringent displacer;
   a second port disposed proximate said second birefringent displacer, said first, second and third ports being disposed parallel to each other;
   a first birefringent wedge set located between said first and second birefringent displacers and in the upper beam path, the optical axes of the wedges of said first birefringent wedge set being disposed orthogonally with respect to each other and orthogonal with respect to the upper beam;
   a second birefringent wedge set located between said first and second birefringent displacers and in the lower beam path, the optical axes of the wedges of said first birefringent wedge set being disposed orthogonally with respect to each other and orthogonal with respect to the lower beam;

a first 45° Faraday rotator disposed on the side of said first birefringent wedge set proximate to the first birefringent displacer and a second 45° Faraday rotator disposed on the side of said first birefringent wedge set proximate to the second birefringent displacer;

a third 45° Faraday rotator disposed on the side of said second birefringent wedge set proximate to the first birefringent displacer and a fourth 45° Faraday rotator disposed on the side of said first birefringent wedge set proximate to the second birefringent displacer.

2. The inline optical circulator as claimed in claim 1 wherein the first and third 45° Faraday rotators comprise the same Faraday rotator.

3. The inline optical circulator as claimed in claim 1 wherein the second and fourth 45° Faraday rotators comprise the same Faraday rotator.

4. The inline optical circulator as claimed in claim 1 wherein the first and second birefringent wedge sets are formed by a single pair of birefringent wedges.

5. The inline optical circulator as claimed in claim 4 wherein the first Faraday rotator rotates the upper beam by +45° and the and third Faraday rotator rotates the lower beam by −45°.

6. The inline optical circulator as claimed in claim 1 further including alignment means to assure alignment of the light paths trough the circulator, said alignment means comprising means for tilting the mechanical axis of the first and second birefringent wedge sets.

7. The inline optical circulator as claimed in claim 1 wherein the ends of said first and said second optical fibers are disposed at non parallel angles to each other to assure the intersection point of the light paths through the birefringent displacers.

8. An inline optical circulator, for at least three optical fibers comprising:

a first birefringent displacer for separating an input beam into upper and lower beams said upper and lower beams being orthogonally polarized with respect to each other;

a second birefringent displacer for combining said upper and lower beams into a single beam;

first and third ports disposed proximate said first birefringent displacer to launch light beams from said first and third optical fibers into said first birefringent displacer; a second port disposed proximate said second birefringent displacer, said first, second and third ports being disposed parallel to each other;

a 45° Faraday rotator and a ½ waveplate located between said first and second birefringent displacers in the upper beam path;

first and second ½ waveplates located between said first and second birefringent displacers in the lower beam path;

a first assembly located before and spaced apart from said first birefringent displacer in the lower beam path, said first assembly having a pair of oppositely oriented birefringent wedges with the optical axes of the wedges of said first birefringent wedge set being disposed orthogonally with respect to each other and orthogonal with respect to the upper beam and a 45° Faraday rotator located between the pair of birefringent wedges;

a second assembly located before and proximate to said first birefringent displacer in the upper beam path, said second assembly having a single birefringent wedge with the optical axes of the wedges of said first birefringent wedge set being disposed orthogonally with respect to each other and orthogonal with respect to the upper beam and a 45° Faraday rotator located between the pair of birefringent wedges.

9. The inline optical circulator as claimed in claim 8 wherein the ½ waveplate located in the upper beam path between the first and second birefringent displacers and the ½ waveplate located in the lower beam path between the first and second birefringent displacers comprise the same ½ waveplate.

10. An inline optical circulator, for at least three optical fibers comprising:

a first birefringent displacer for separating an input beam into upper and lower beams said upper and lower beams being orthogonally polarized with respect to each other;

a second birefringent displacer for combining said upper and lower beams into a single beam;

first and third optical fibers disposed proximate said first birefringent displacer to launch light beams from said first and third optical fibers into said first birefringent displacer; a second optical fiber disposed proximate said second birefringent displacer, said first, second and third fibers being disposed parallel to each other;

the ends of at least said first and second optical fibers being disposed at an angle to each other;

a first birefringent wedge set located between said first and second birefringent displacers and in the upper beam path, the optical axes of the wedges of said first birefringent wedge set being disposed orthogonally with respect to each other and orthogonal with respect to the upper beam;

a second birefringent wedge set located between said first and second birefringent displacers and in the lower beam path, the optical axes of the wedges of said first birefringent wedge set being disposed orthogonally with respect to each other and orthogonal with respect to the lower beam;

means for tilting at least one of said first and second birefringent wedge sets so as to permit alignment of the device;

a first 45° Faraday rotator disposed on the side of said first birefringent wedge set proximate to the first birefringent displacer and a second 45° Faraday rotator disposed on the side of said first birefringent wedge set proximate to the second birefringent displacer;

a third 45° Faraday rotator disposed on the side of said second birefringent wedge set proximate to the first birefringent displacer and a fourth 45° Faraday rotator disposed on the side of said first birefringent wedge set proximate to the second birefringent displacer.

11. The inline optical circulator as claimed in claim 10 wherein the first and third 45° Faraday rotators comprise the same Faraday rotator.

12. The inline optical circulator as claimed in claim 10 wherein the second and fourth 45° Faraday rotators comprise the same Faraday rotator.

13. The inline optical circulator as claimed in claim 10 wherein the first and second birefringent wedge sets are formed by a single pair of birefringent wedges.

14. The inline optical circulator as claimed in claim 13 wherein the first Faraday rotator rotates the upper beam by +45° and the and third Faraday rotator rotates the lower beam by −45°.

* * * * *